(12) United States Patent
Gyoten

(10) Patent No.: US 9,575,397 B2
(45) Date of Patent: Feb. 21, 2017

(54) OPTICAL MEMBER DRIVING DEVICE AND PROJECTION IMAGE DISPLAY APPARATUS

(71) Applicant: Panasonic Intellectual Property Management Co., Ltd., Osaka-shi, Osaka (JP)

(72) Inventor: Takaaki Gyoten, Hyogo (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 73 days.

(21) Appl. No.: 14/657,501

(22) Filed: Mar. 13, 2015

(65) Prior Publication Data

US 2015/0268538 A1   Sep. 24, 2015

(30) Foreign Application Priority Data

Mar. 18, 2014 (JP) ................................. 2014-054640
Feb. 19, 2015 (JP) ................................. 2015-030467

(51) Int. Cl.
*G03B 21/14* (2006.01)
*G02B 26/08* (2006.01)

(52) U.S. Cl.
CPC ......... *G03B 21/142* (2013.01); *G02B 26/0833* (2013.01); *G03B 2205/0061* (2013.01)

(58) Field of Classification Search
CPC ....... G03B 21/28; G03B 21/14; G03B 21/204; G03B 21/208; G03B 21/2053; G02B 7/021; G02B 7/023; G02B 26/08; G02B 26/0833

See application file for complete search history.

(56) References Cited

U.S. PATENT DOCUMENTS

| 8,714,747 | B2* | 5/2014 | Akiyama | G02B 27/102 353/30 |
| 2005/0237493 | A1* | 10/2005 | Tajiri | G01J 1/32 353/85 |
| 2010/0001071 | A1* | 1/2010 | Ohara | G02B 7/021 235/454 |
| 2011/0096298 | A1* | 4/2011 | Huang | G03B 33/12 353/33 |
| 2012/0147280 | A1* | 6/2012 | Osterman | G02B 27/26 349/9 |
| 2014/0036236 | A1* | 2/2014 | Shishido | G03B 21/142 353/31 |

FOREIGN PATENT DOCUMENTS

JP    2007-206567    8/2007

* cited by examiner

*Primary Examiner* — Sultan Chowdhury
(74) *Attorney, Agent, or Firm* — Hamre, Schumann, Mueller & Larson, P.C.

(57) ABSTRACT

An optical member driving device of the present disclosure includes an optical member for changing an optical path, the optical member having a parallel flat plate shape; a driving mechanism having a movable portion controlled to move in a direction orthogonal to a surface of the optical member by a drive signal, the driving mechanisms being disposed outside the optical member; a connecting member rotatably connecting an end of the optical member and the movable portion of the driving mechanism on two axes orthogonal to each other at a surface center of the optical member; a support portion disposed between the end of the optical member and the movable portion of the driving mechanism, the support portion rotatably pivoting the connecting member; and a controller configured to control the movable portion of the driving mechanism.

8 Claims, 14 Drawing Sheets

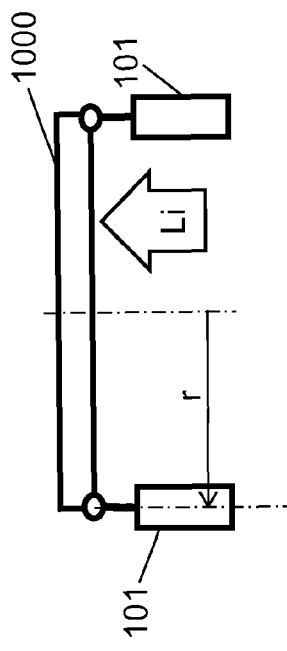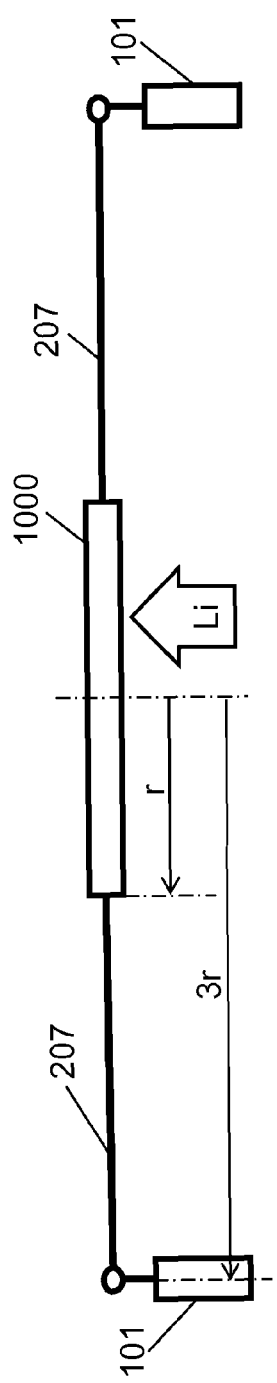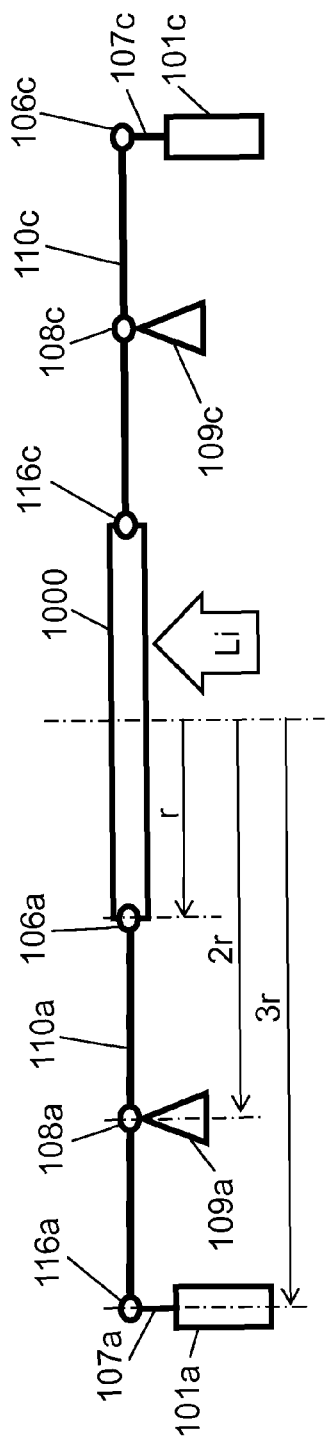
FIG. 5A
FIG. 5B
FIG. 5C

OPTICAL MEMBER DRIVING DEVICE AND PROJECTION IMAGE DISPLAY APPARATUS

BACKGROUND

1. Technical Field

The present disclosure relates to an optical member driving device for moving a position of an image to be projected for display, and a projection image display apparatus that uses the same.

2. Description of the Related Art

PTL 1 discloses an image moving device that moves a display position of a projector which projects and displays an image. This image moving device includes piezoelectric devices that hold four corners of parallel flat plate glass, between a fixed pixel type display device for optically modulating an image, and a quadrangular parallel flat plate glass for moving an image position. The image moving device applies a voltage to these four piezoelectric devices to move an image.

CITATION LIST

Patent Literature

PTL 1: Unexamined Japanese Patent Publication No. 2007-206567

SUMMARY

The image moving device described in PTL 1 has a structure in which the four piezoelectric devices that support the four corners of the parallel flat plate glass are provided between the fixed pixel type display device that optically modulates an image, and the quadrangular parallel flat plate glass that moves an image position The piezoelectric devices operate as actuators for moving the parallel flat plate glass, and an elongation amount of each of the piezoelectric devices is proportional to a thickness of each of the piezoelectric devices.

In a case where image movement of ½ pixel of the display device is achieved by the projector shown in PTL 1, piezoelectric devices each having 10 times or larger thickness than a thickness of the display device are required, and there is a problem that it is difficult to dispose such piezoelectric devices in a projector having an optical component disposed in a narrow space.

In order to solve this problem, it is conceivable that an outer shape of the parallel flat plate glass is made larger than an outer shape of the display device, and piezoelectric devices having increased thicknesses are mounted on the parallel flat plate glass located outside the outer shape of the display device.

However, in this configuration, a position at which the piezoelectric devices drive the parallel flat plate glass becomes far from the center of the parallel flat plate glass, and therefore a rotational moment for driving the parallel flat plate glass with the piezoelectric devices significantly increases. This causes a problem that the elongation amount of each of the piezoelectric devices for moving the parallel flat plate glass is required to be further increased.

The present disclosure provides an optical member driving device and a projection image display apparatus each enabling suppression of increase in a rotational moment of actuators for driving a parallel flat plate glass, and suppression of increase in elongation amounts of the actuators, even in a case where the actuators are disposed at positions distant from the center of the parallel flat plate glass.

An optical member driving device of the present disclosure includes an optical member for changing an optical path, the optical member having a parallel flat plate shape; a driving mechanism having a movable portion controlled to move in a direction orthogonal to a surface of the optical member by a drive signal, the driving mechanisms being disposed outside the optical member; a connecting member rotatably connecting an end of the optical member and the movable portion of the driving mechanism on two axes orthogonal to each other at a surface center of the optical member; a support portion disposed between the end of the optical member and the movable portion of the driving mechanism, the support portion rotatably pivoting the connecting member; and a controller configured to control the movable portion of the driving mechanism.

The optical member driving device of the present disclosure is capable of suppressing increase in a rotational moment of the driving mechanism, and is effective for suppressing an amount of movement of the movable portion of the driving mechanism.

BRIEF DESCRIPTION OF DRAWINGS

FIG. 5A to FIG. 5C are diagrams for illustrating a principle of the optical member driving device of the first exemplary embodiment;

DETAILED DESCRIPTION OF THE PREFERRED EMBODIMENTS

Hereinafter, exemplary embodiments are described in detail with reference to the drawings appropriately. However, excessively detailed description may be omitted. For example, detailed description of matters that are already well known, or redundant description for substantially the same configuration may be omitted. This is to avoid making the following description unnecessarily redundant, and to facilitate the understanding by a person skilled in the art.

The attached drawings and the following description are provided in order that a person skilled in the art sufficiently understands the present disclosure, and are not intended to limit the subject matter recited in the scope of the claims.

First Exemplary Embodiment

Hereinafter, with reference to FIG. 1 to FIG. 11, a first exemplary embodiment is described.

[1-1. Configuration]

Figure 1:
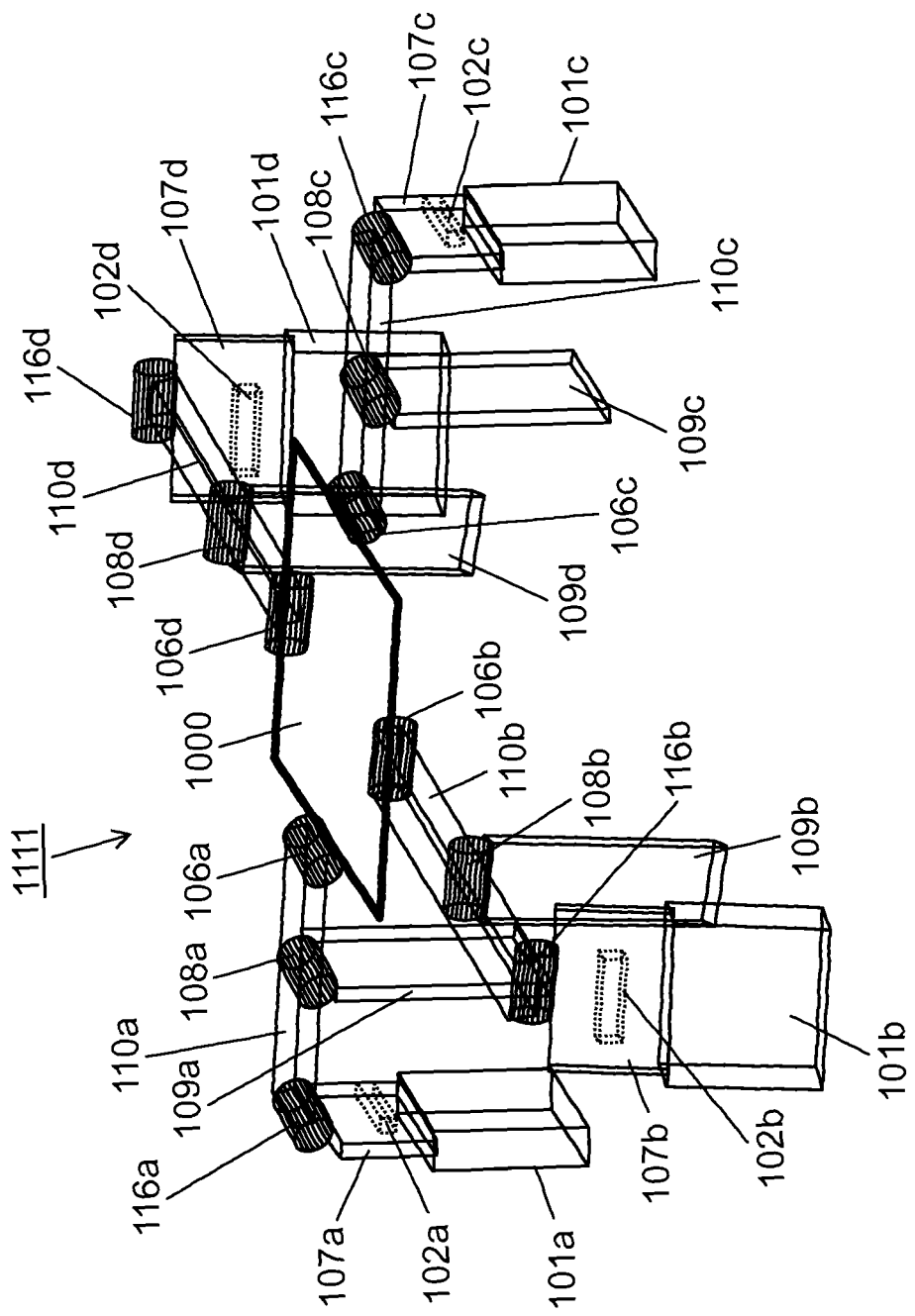
FIG. 1 is a diagram showing a structure of an optical member driving device of a first exemplary embodiment.

FIG. 1 is a schematic perspective view showing a structure of optical member driving device 1111.

Optical member driving device 1111 includes parallel flat plate glass 1000, four connecting members 110a, 110b, 110c and 110d, and actuator A101a, actuator B101b, actuator C101c, and actuator D101d serving as four driving mechanisms. To ends of parallel flat plate glass 1000, respective first ends of connecting members 110a to 110d are rotatably connected through linking portions 106a, 106b, 106c and 106d. Respective second ends of connecting members 110a to 110d are rotatably connected to movable portions 107a, 107b, 107c and 107d of actuator A101a to actuator D101d through linking portions 116a, 116b, 116c and 116d. Movable portions 107a to 107d are provided with four position sensors 102a, 102b, 102c and 102d, respectively.

Connecting members 110a to 110d are rotatably supported at central positions by support portions 109a, 109b, 109c and 109d through hinges 108a, 108b, 108c and 108d, respectively.

Figure 2:
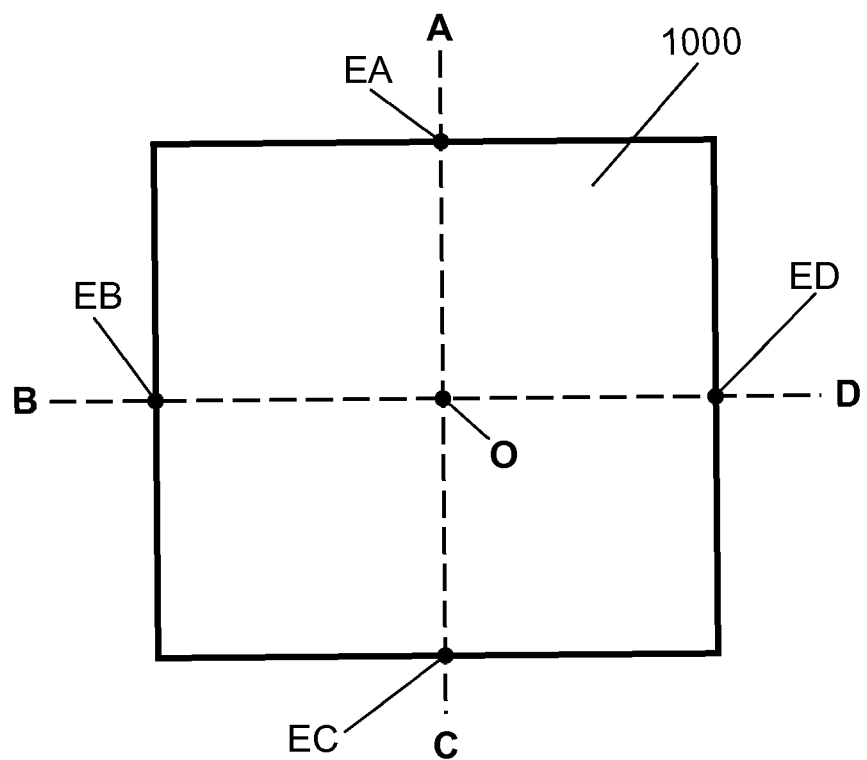
FIG. 2 is a plan view of a parallel flat plate glass used in the optical member driving device of the first exemplary embodiment.

FIG. 2 is a plan view of parallel flat plate glass 1000. Linking portions 106a to 106d shown in FIG. 1 are rotatably connected at central ends EA, EB, EC and ED of respective sides, on A-C axis and B-D axis orthogonal to each other at surface center O of parallel flat plate glass 1000. Movable portions 107a to 107d of actuator A101a to actuator D101d vertically move, so that ends EA, EB, EC and ED of parallel flat plate glass 1000 vertically move through connecting members 110a to 110d, respectively. Parallel flat plate glass 1000 is formed in a quadrangle in this exemplary embodiment, but may be formed in a circle.

Figure 3:
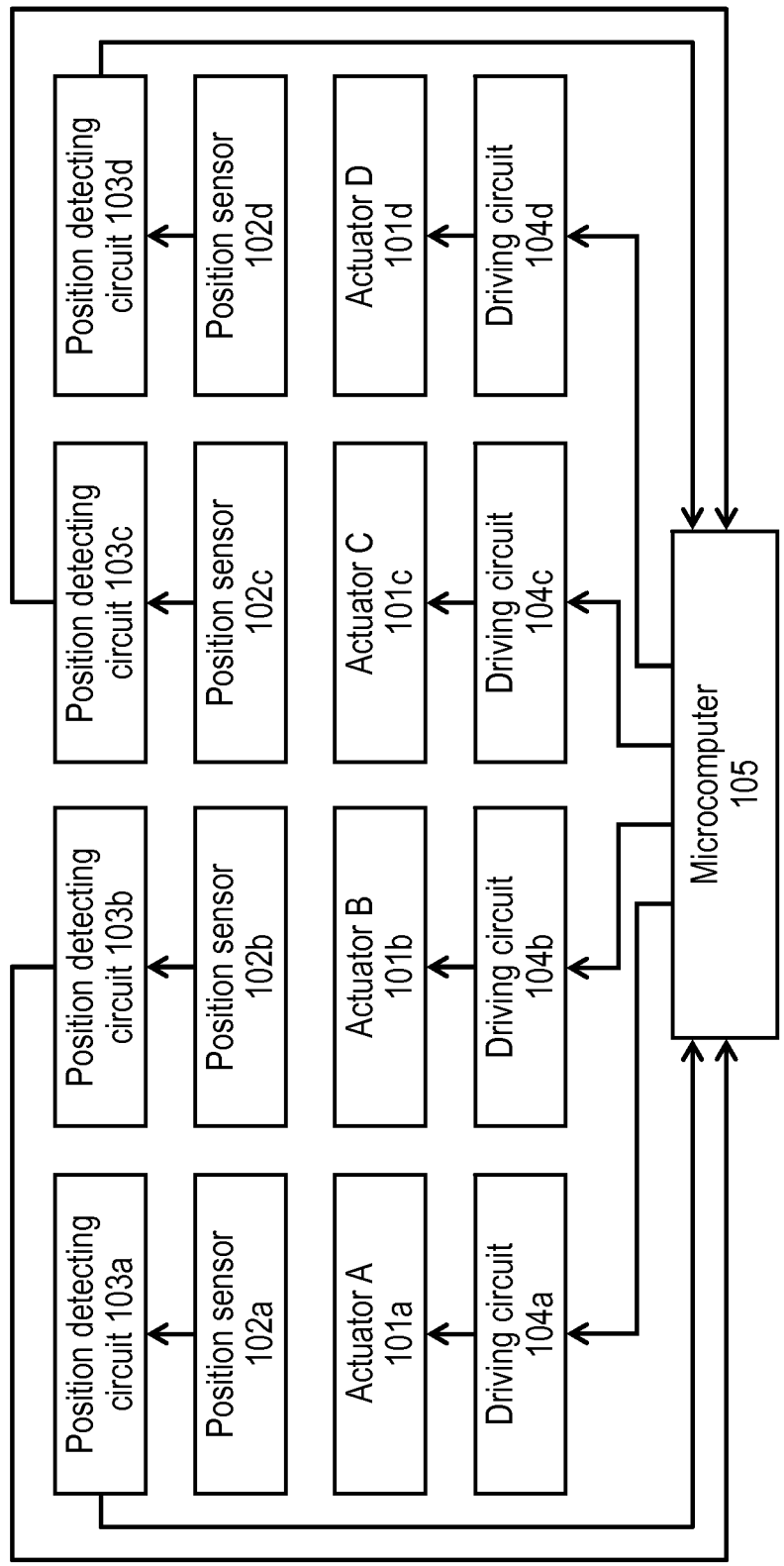
FIG. 3 is a block diagram showing an electrical configuration of the optical member driving device of the first exemplary embodiment.

FIG. 3 is a block diagram showing a circuit configuration of optical member driving device 1111. Four actuators A101a to D101d are driven by drive circuits 104a, 104b, 104c and 104d controlled by control signals of single microcomputer 105.

Actuator A101a to actuator D101d are driven by drive signal currents from drive circuits 104a to 104d such that movable portions 107a to 107d advance/retreat in a uniaxial direction. Position detection circuits 103a, 103b, 103c and 103d detect position sensors 102a to 102d provided in movable portions 107a to 107d, thereby detecting positions of movable portions 107a to 107d.

Then, respective detection outputs of position detection circuit 103a to 103d are input to microcomputer 105. Microcomputer 105 always monitors the respective positions of movable portions 107a to 107d of actuator A101a to actuator D101d based on these detection signals, and servo-controls actuator A101a to actuator D101d.

Actuator A101a to actuator D101d are sometimes simply referred to as actuators 101, movable portions 107a to 107d are sometimes simply referred to as movable portions 107, position sensors 102a to 102d are sometimes simply referred to as position sensors 102, connecting members 110a to 110d are sometimes simply referred to as connecting members 110, linking portions 106a to 106d are sometimes simply referred to as linking portions 106, linking portions 116a to 116d are sometimes simply referred to as linking portions 116, support portion 109a to 109d are sometimes simply referred to as support portions 109, and hinges 108a to 108d are sometimes simply referred to as hinges 108.

Figure 4:
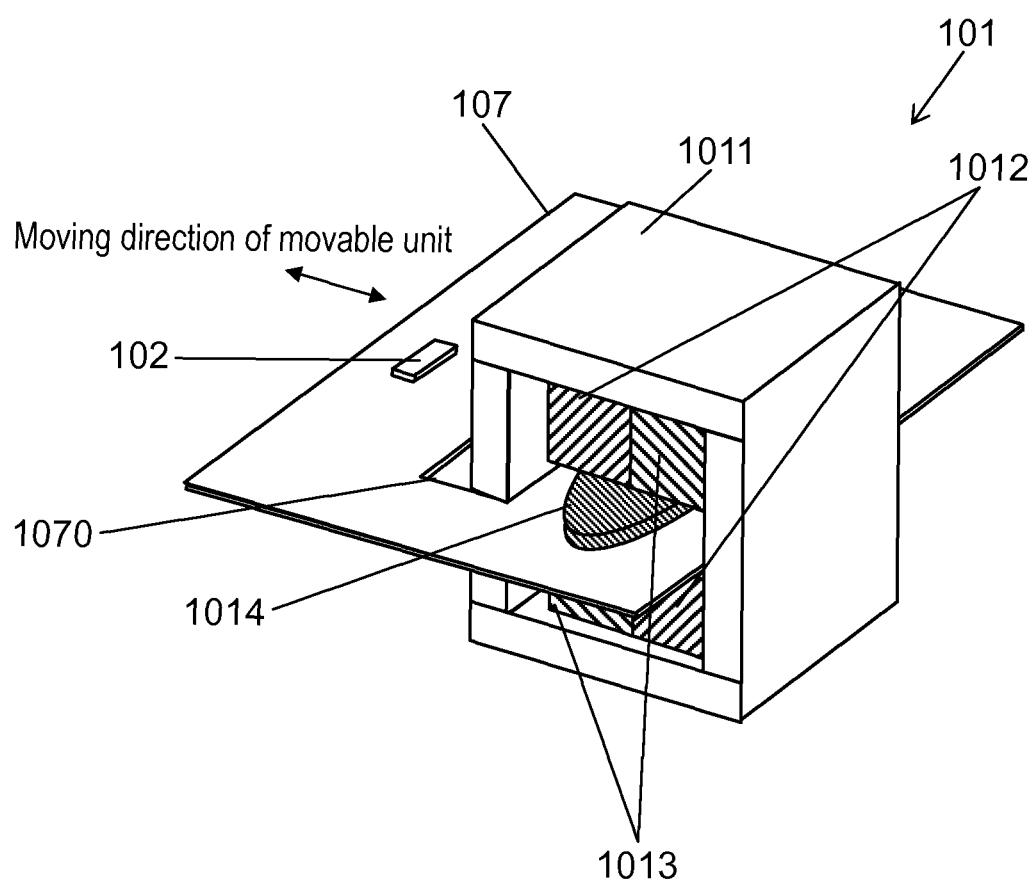
FIG. 4 is a schematic diagram of an actuator used in the optical member driving device of the first exemplary embodiment.

In this exemplary embodiment, as each actuator 101, a voice coil motor (VCM) is used. FIG. 4 shows an example of a structure of the VCM, in which permanent magnets having different magnetic poles (N-pole permanent magnets 1012 and S-pole permanent magnets 1013) are disposed so as to face each other at a constant distance in square-shaped yoke 1011, and movable portion 107 is disposed between permanent magnets 1012 and 1013 disposed so as to face each other.

Movable portion 107 is formed with guide window 1070, yoke 1011 is inserted into guide window 1070, and coil 1014 provided in movable portion 107 is disposed between permanent magnets 1012 and 1013 disposed so as to face each other. When a drive signal current flows through coil 1014, movable portion 107 moves in a uniaxial direction along an arrow shown in FIG. 4.

Driving force of this movable portion 107 is generated in a positive direction or a negative direction from a reference position, according to magnitude of a signal current flowing through coil 1014. Position detection circuits 103a to 103d shown in FIG. 3 detect position sensors 102a to 102d mounted on movable portions 107a to 107d, respectively, thereby detecting an amount of movement of each movable portion 107. A slight clearance is generated between movable portion 107 mounted with coil 1014 and permanent magnets 1012 and 1013.

Accordingly, when force in a perpendicular direction to the uniaxial direction in which movable portion 107 is driven by the drive signal current is applied to movable portion 107, movable portion 107 is displaced by an allowable distance of the slight clearance. A magnet having large mass is fixed as the voice coil motor, and a weight of coil 1014 mounted on movable portion 107 is reduced, thereby enabling reduction in moment.

Next, relation among parallel flat plate glass 1000, connecting member 110, actuators 101, and support portion 109 is described in detail with reference to FIG. 5A to FIG. 5C, FIG. 6A, and FIG. 6B. While FIG. 5A to FIG. 5C, FIG. 6A, and FIG. 6B each illustrate members disposed on the A-C axis shown in FIG. 2, relation among members disposed on B-D axis are similar to relation among the members disposed on A-C axis.

As shown in FIG. 5A, when a configuration in which the ends of parallel flat plate glass 1000 are directly driven by actuators 101 without connecting members 110 employed, an optical component larger than parallel flat plate glass 1000, for example, a prism or the like cannot be disposed on a side close to actuators 101. That is, a size of parallel flat plate glass 1000 restricts a space for disposing the optical member such as the prism located on the side close to actuators 101, upon which input light beam Li is incident.

As shown in FIG. 5B, when a configuration, in which arms 207 are provided so as to extend integrally from parallel flat plate glass 1000, and actuators 101 drive tips of arms 207, is employed, the optical component larger than parallel flat plate glass 1000 can be disposed on the side close to actuators 101. However, a position in which each actuator 101 drives parallel flat plate glass 1000 is far from surface center O of parallel flat plate glass 1000.

An moment that acts on each actuator 101 is a total of a rotational moment for rotating parallel flat plate glass 1000, and a rotational moment for rotating arms 207 connecting parallel flat plate glass 1000 and movable portions 107 of actuators 101, and a rotational moment by mass of movable portions 107 of actuators 101. Each rotational moment increases in proportion to a square of a distance from surface center O of parallel flat plate glass 1000.

For example, when a position at which each actuator 101 drives is three times distance r from surface center O of parallel flat plate glass 1000 to the end of parallel flat plate glass 1000, a rotational moment by movable portions 107 of actuators 101 becomes 9 times. Furthermore, the rotational moment for rotating arms 207 is added, and a total rotational moment largely increases, thereby causing a situation in which a rotational speed enabling drive reduces.

As shown in FIG. 5C, in optical member driving device 1111 of this exemplary embodiment, central parts of connecting members 110 are rotatably supported through hinges 108 by support portions 109, the first ends of connecting members 110 are rotatably connected to parallel flat plate glass 1000 through linking portions 106, and the second ends of connecting members 110 are rotatably connected to movable portions 107 of actuators 101 through linking portions 116.

Support portions 109 rotatably support connecting members 110 with hinges 108 having axes (not shown) as rotation centers. Horizontal distances between parallel flat plate glass 1000 and connecting members 110, and horizontal distances between movable portions 107 of actuators 101 and connecting members 110 are changed by rotation of connecting members 110, and therefore linking portions 106 and linking portions 116 are configured by flat springs (not shown) or the like so as to absorb changed amounts of the horizontal distances.

In connection by connecting members 110 and support portions 109 of FIG. 5C, connecting members 110 and support portions 109 configure levers. A position at which each support portion 109 supports connecting member 110 is a fulcrum of the lever, a position at which each actuator 101 is connected to connecting member 110 is a point of effort of the lever, and a position at which each connecting member 110 is connected to parallel flat plate glass 1000 is a point of load of the lever.

In connection by connecting members 110 and support portions 109 of FIG. 5C, distances from the fulcrums of the levers to the points of effort are equal to distances from the fulcrums to the points of load, and therefore force having the same magnitude as force applied to each point of effort and having an opposite direction to the force applied to each point of effort is applied to the point of load. That is, a connection case of FIG. 5C is different from a direct connection case of FIG. 5A, in which actuators 101 are directly mounted on parallel flat plate glass 1000, in that displacement directions are opposite, but the connection case of FIG. 5C is equivalent to the direct connection case of FIG. 5A in acting force and an displacement amount. That is, it is possible to achieve a structure in which the rotational moment is increased by a rotational moment of connecting members 110, but is substantially the same rotational moment as the rotational moment in the direction connection case of FIG. 5A, and a component larger than parallel flat plate glass 1000, for example, a prism can be disposed on the side close to actuators 101 of parallel flat plate glass 1000.

Figure 6A:
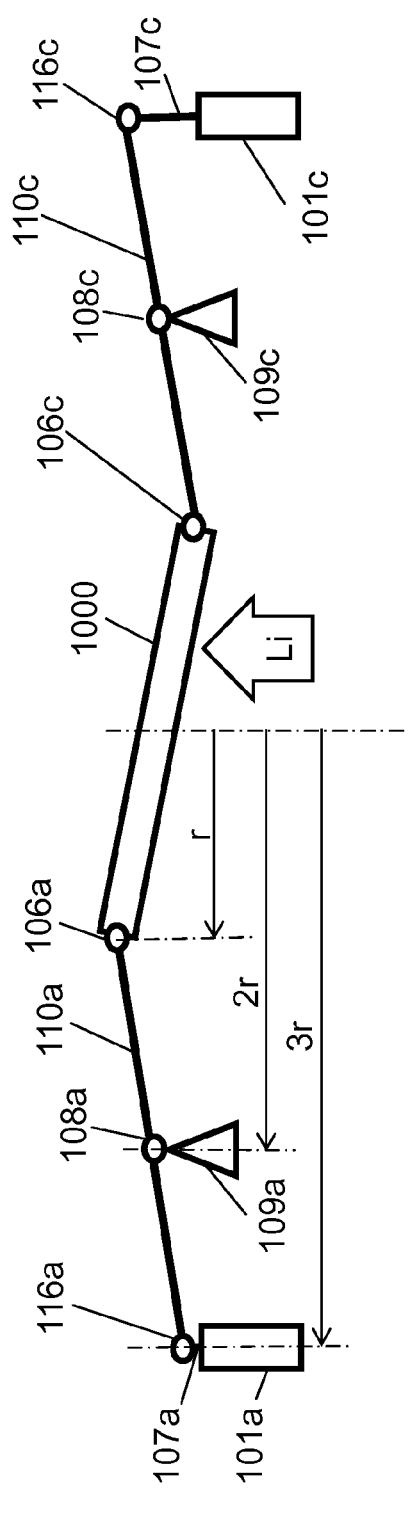
FIG. 6A and FIG. 6B are diagrams showing operation of the optical member driving device of the first exemplary embodiment.
Figure 6B:
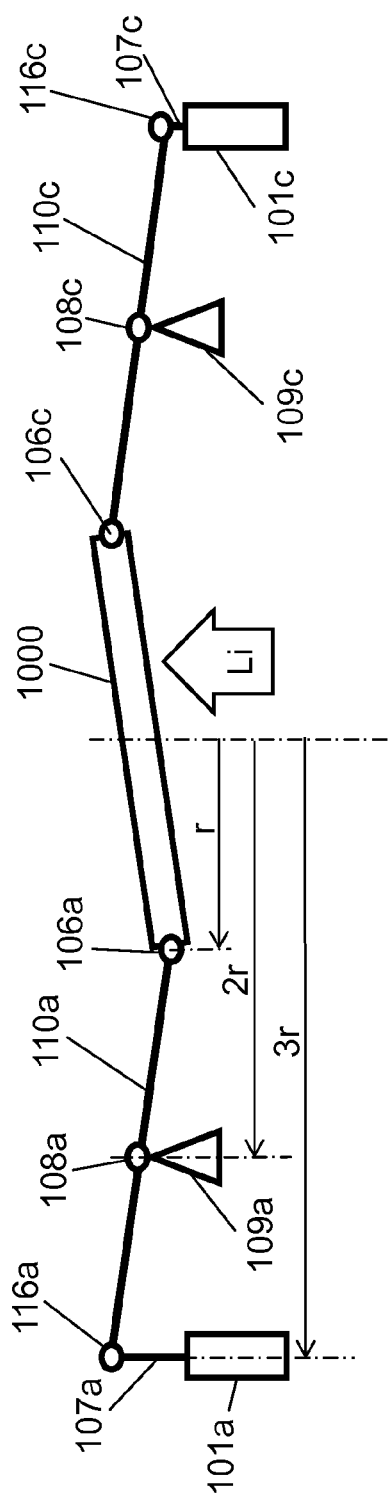

FIG. 6A and FIG. 6B each show movement during operation of actuators 101. As shown in FIG. 6A, when movable portion 107a of left actuator A101a moves in a contraction direction, and movable portion 107c of right actuator C101c moves in an extension direction by the same amount as movable portion 107a of left actuator A101a, parallel flat plate glass 1000 rotates about surface center O clockwise.

As shown in FIG. 6B, when movable portion 107a of left actuator A101a moves in the extension direction, and movable portion 107c of right actuator C101c moves in the contraction direction by the same amount as movable portion 107a of left actuator A101a, parallel flat plate glass 1000 rotates about surface center O counterclockwise.

[1-2. Operation]

Operation of optical member driving device 1111 configured as described above is hereinafter described.

Figure 7:
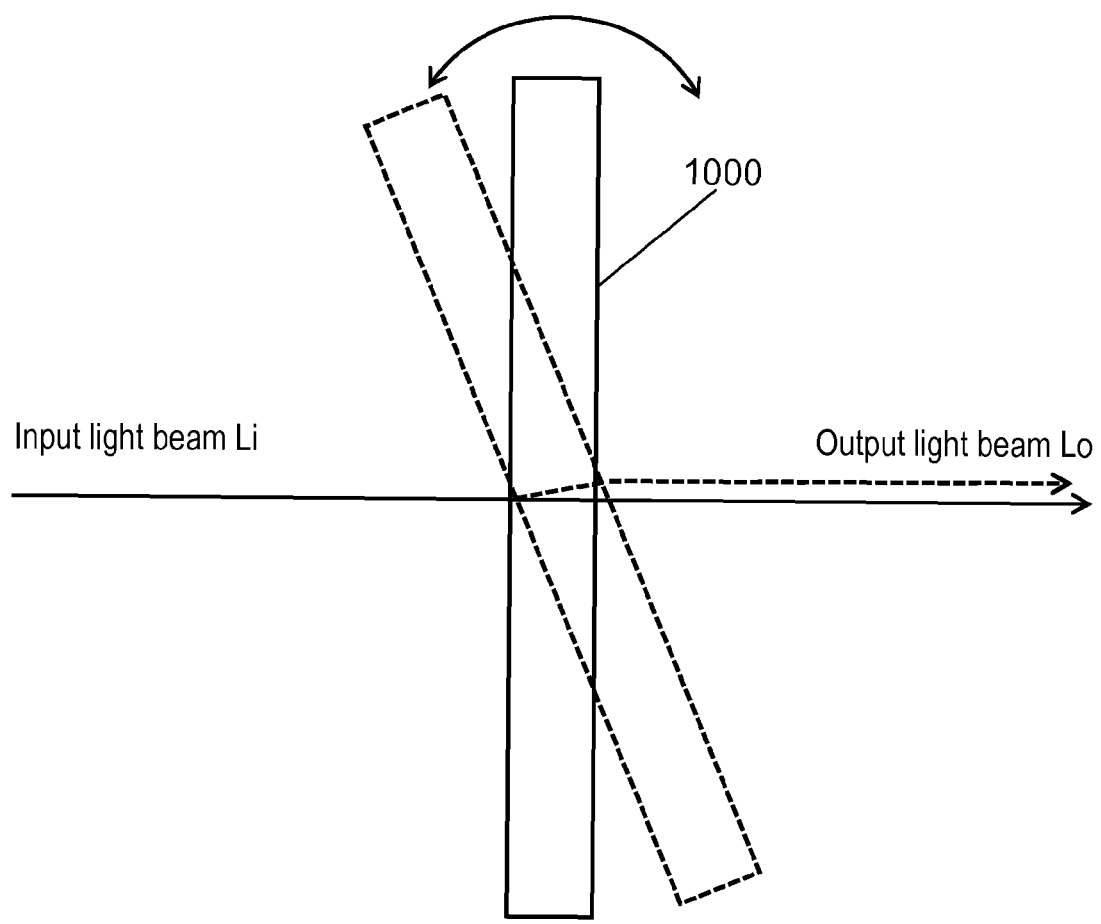
FIG. 7 is a diagram for illustrating a principle of changing an optical path by the parallel flat plate glass.

As shown in FIG. 7, when the surface of parallel flat plate glass 1000 is orthogonal to input light beam Li, input light beam Li advances straight without being refracted on an interface between parallel flat plate glass 1000 and air. Input light beam Li passes through parallel flat plate glass 1000 without being refracted, and parallel flat plate glass 1000 is a parallel flat surface, and has an interface orthogonal to a light beam also on an interface with air, and therefore input light beam Li advances straight without being refracted. Therefore, in a case where input light beam Li is image light, an image does not move.

On the other hand, when parallel flat plate glass 1000 is not orthogonal to input light beam Li as shown by a broken line of FIG. 7, input light beam Li is refracted on the interface between parallel flat plate glass 1000 and air. Input light beam Li that is refracted and incident upon parallel flat plate glass 1000 passes through parallel flat plate glass 1000, and the interface with air is not orthogonal to the interface with the light beam, and therefore input light beam Li is refracted.

An angle, at which the input light beam is refracted when the input light beam is incident upon parallel flat plate glass 1000, is equal to an angle, at which the input light beam is refracted when the input light beam emits from parallel flat plate glass 1000. Therefore, when input light beam Li is image light, image light of output light beam Lo moves parallel to a tilt direction of parallel flat plate glass 1000. As a result, a display position of an image output and projected from parallel flat plate glass 1000 moves.

For example, while movable portion 107b of actuator B101b and movable portion 107d of actuator D101d are not displaced, movable portion 107a of actuator A101a is displaced upward and movable portion 107c of actuator C101c is displaced downward from a state shown in FIG. 5C, so that parallel flat plate glass 1000 can be displaced about B-D axis as shown in FIG. 6B.

By utilization of such a principle, optical member driving device 1111 can rotate parallel flat plate glass 1000 with actuators 101.

Figure 8:
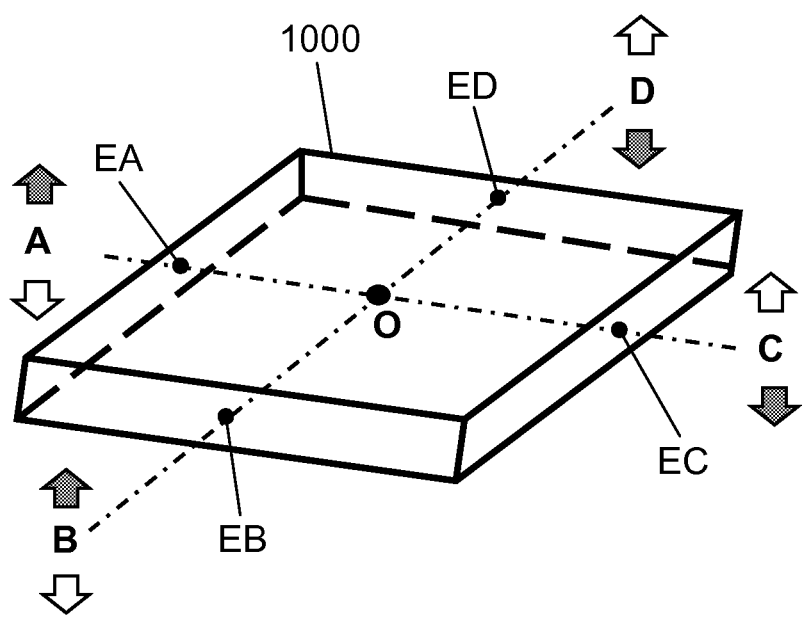
FIG. 8 is a diagram showing a direction of tilt drive of the parallel flat plate glass.
Figure 9:
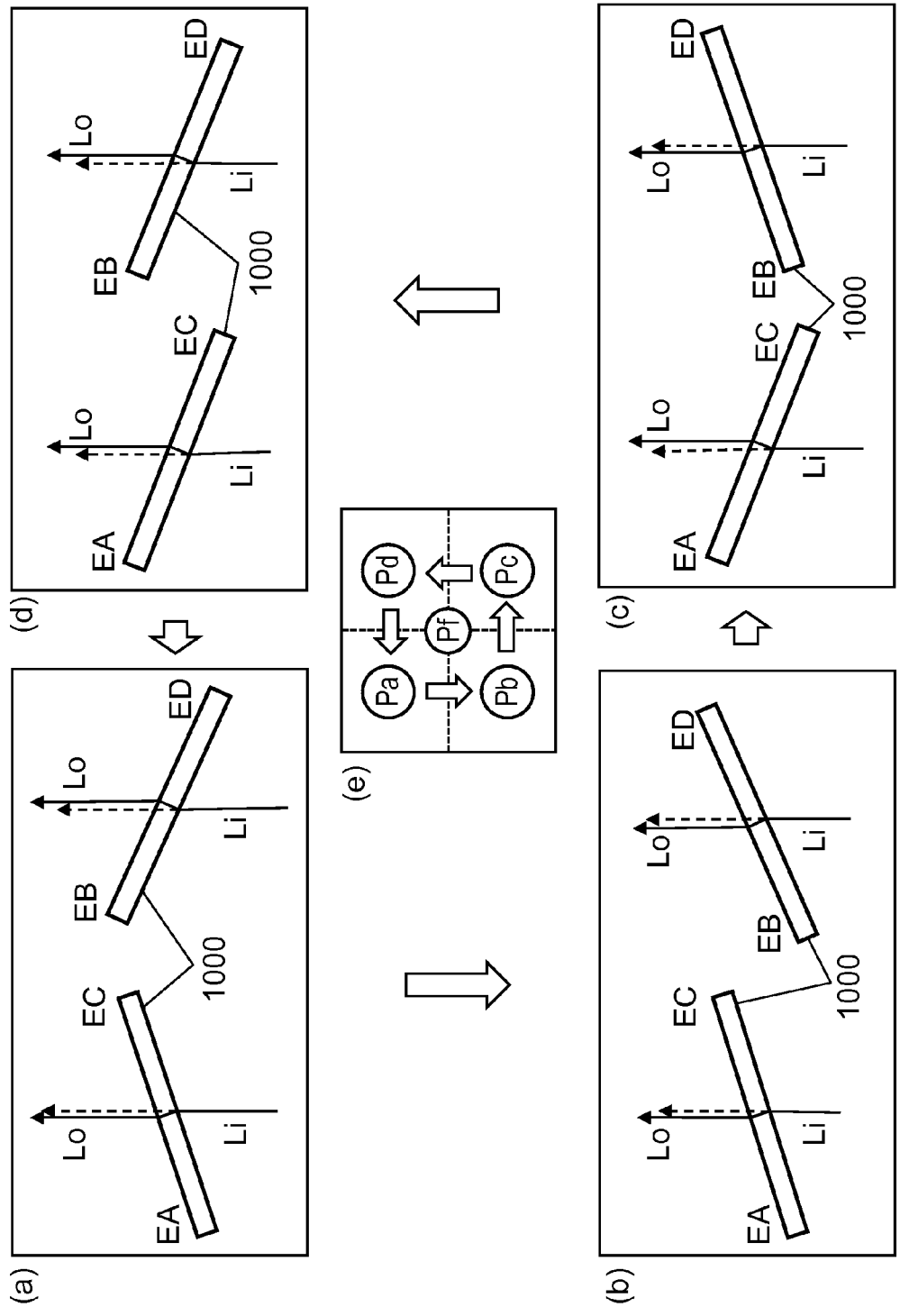
FIG. 9 is a diagram for illustrating a principle of outputting an input light beam at a plurality of positions by the parallel flat plate glass.

FIG. 8 and FIG. 9 are diagrams for illustrating such control of actuators 101.

As shown in FIG. 8, A-C axis and B-D axis intersect with each other at surface center O on the same plane. Operation of moving pixels by vertically moving ends EA and EC on A-C axis and vertically moving ends EB and ED on B-D axis, in a state where this intersection is held at a fixed position is described with reference to FIG. 9.

In FIG. 9, each broken arrow shows a case where input light beam Li is incident perpendicular to parallel flat plate glass 1000, namely, output light beam Lo at a horizontal position of parallel flat plate glass 1000. When input light beam Li is image light, output light beam Lo is displayed at position Pf shown in (e) of FIG. 9, as a pixel. For convenience, this state is referred to as a reference state.

Position Pa shown in (e) of FIG. 9 is a position at which a pixel is displayed when parallel flat plate glass 1000 is in a state shown in (a) of FIG. 9 (first state). That is, in this state, actuator C101*c* moves end EC upward, and actuator A101*a* moves end EA downward by the same amount as end EC. With this movement, actuator D101*d* moves end ED downward, and actuator B101*b* moves end EB upward by the same amount as end ED, so that the pixel can be displayed at position Pa shown in (e) of FIG. 9.

Position Pb shown in (e) of FIG. 9 is a position at which the pixel is displayed when parallel flat plate glass 1000 is in a state shown in (b) of FIG. 9 (second state). That is, in this state, actuator C101*c* moves end EC upward, and actuator A101*a* moves end EA downward by the same amount as end EC. With this movement, actuator D101*d* moves end ED upward, and actuator B101*b* moves end EB downward by the same amount as end ED, so that the pixel can be displayed at position Pb shown in (e) of FIG. 9.

Position Pc shown in (e) of FIG. 9 is a position at which the pixel is displayed when parallel flat plate glass 1000 is in a state shown in (c) of FIG. 9 (third state). That is, in this state, actuator C101*c* moves end EC downward, and actuator A101*a* moves end EA upward by the same amount as end EC. With this movement, actuator D101*d* moves end ED upward, and actuator B101*b* moves end EB downward by the same amount as end ED, so that pixel c can be displayed at position Pc shown in (e) of FIG. 9.

Position Pd shown in (e) of FIG. 9 is a position at which the pixel is displayed when parallel flat plate glass 1000 is in a state shown in (d) of FIG. 9 (fourth state). That is, in this state, actuator C101*c* moves end EC downward, and actuator A101*a* moves end EA upward by the same amount as end EC. With this movement, actuator D101*d* moves end ED downward, and actuator B101*b* moves end EB upward by the same amount as end ED, so that the pixel can be displayed at position Pd shown in (e) of FIG. 9.

At timing of the first to fourth states shown in (a) to (d) of FIG. 9, image light is input to parallel flat plate glass 1000, so that pixels can be displayed at different four positions Pa to Pd shown in (e) of FIG. 9.

Even when displacement amounts of movable portions 107 of actuators 101 (hereinafter, simply referred to as "actuator displacement amounts") are controlled to the same displacement amount as a target, errors are caused by limitation of accuracy of position sensors 102.

Figure 10A:
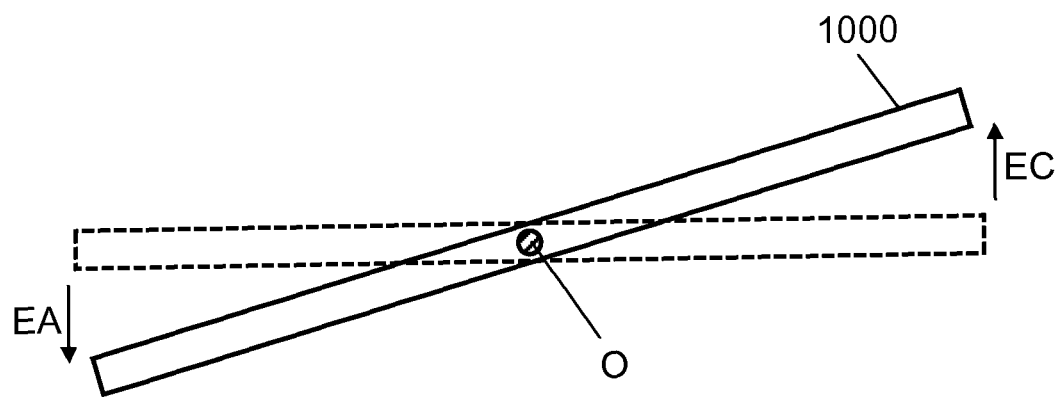
FIG. 10A and FIG. 10B are diagrams for illustrating position shift of the parallel flat plate glass.

In a case where actuator A101*a* and actuator C101*c* are driven while actuator B101*b* and actuator D101*d* are not displaced as shown in FIG. 10A, an amount of downward displacement of actuator A101*a* and an amount of upward displacement of actuator C101*c* are equal to each other in a normal state. In this case, center O of parallel flat plate glass 1000 is not displaced before/after actuator A101*a* and actuator C101*c* are driven.

Figure 10B:
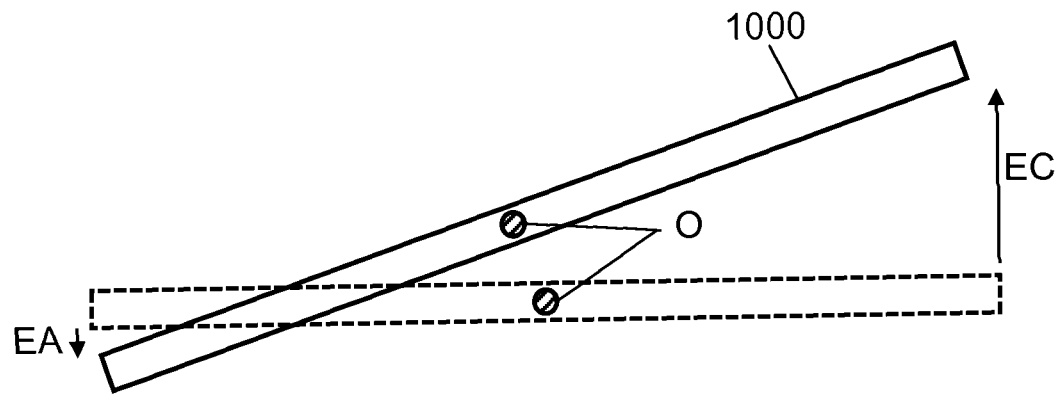

However, as shown in FIG. 10B, the amount of upward displacement of actuator C101*c* is sometimes greater than the amount of downward displacement of actuator A101*a* due to the above factor. That is, displacement amounts of end EA and end EC of parallel flat plate glass 1000 are sometimes different. In this case, surface center O of parallel flat plate glass 1000 is displaced before/after actuator A101*a* and actuator C101*c* are driven.

In such a situation, positions of movable portions 107*b* and 107*d* of actuator B101*b* and actuator D101*d* mounted on parallel flat plate glass 1000, which are determined by difference between the displacement amounts of actuator A101*a* and actuator C101*c*, are different from original positions.

Therefore, microcomputer 105 generates large driving force to four actuators 101, to control parallel flat plate glass 1000 to move to an original position, thereby generating high distortion stress in parallel flat plate glass 1000.

As shown in FIG. 3, the device of the present disclosure is configured such that single microcomputer 105 controls the four actuators. Accordingly, as shown in FIG. 10B, microcomputer 105 can detect and correct stationary and large drive outputs to actuators 101, which are generated in a case where the displacement amounts of actuator A101*a* and actuator C101*c* are different.

Figure 11:
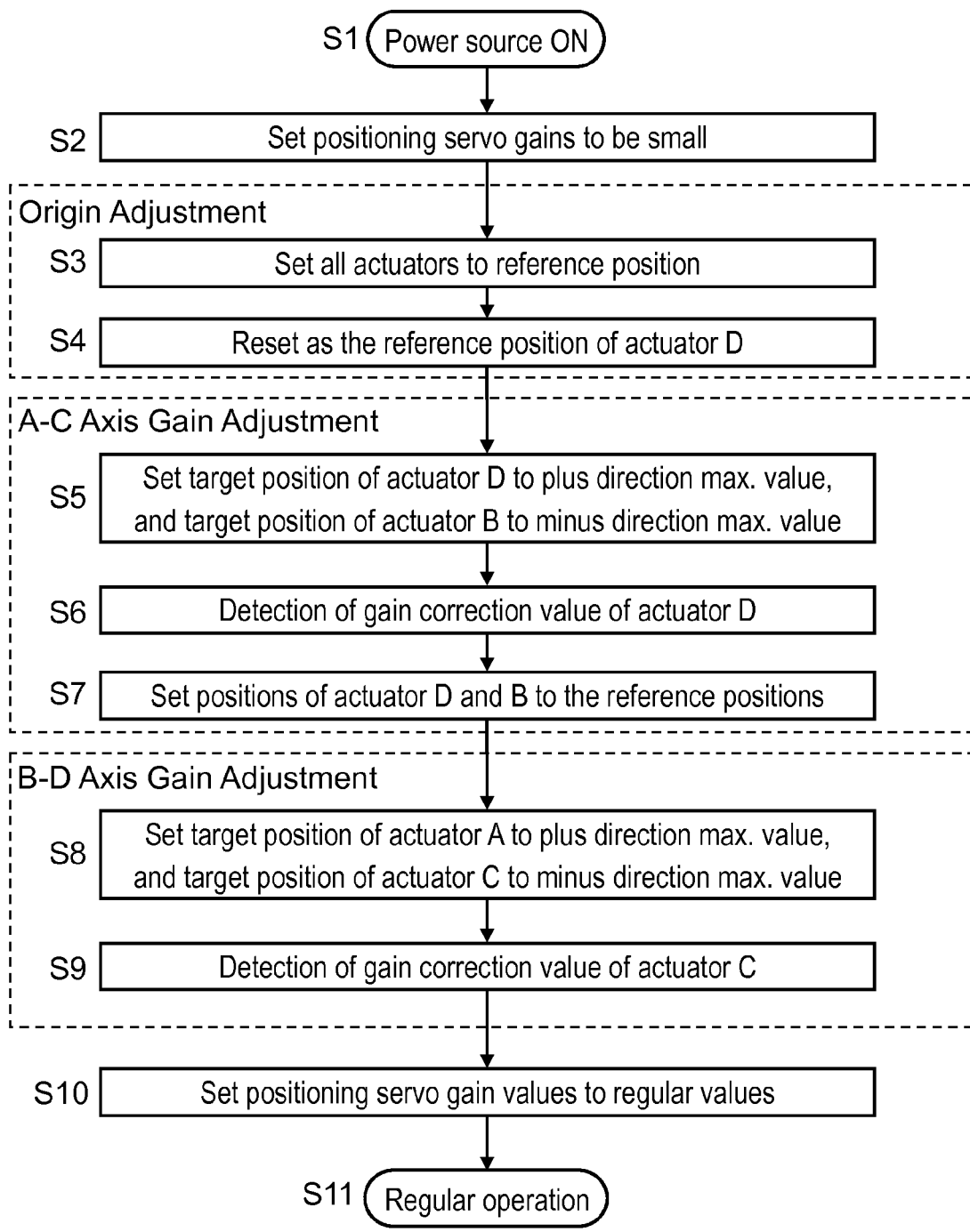
FIG. 11 is a diagram for illustrating initial adjustment of the actuators.

FIG. 11 shows an example of a process flowchart of control position error correction control by microcomputer 105 of optical member driving device 1111 of the present disclosure.

In a case where a point where A-C axis and B-D axis intersect, shown in FIG. 2 and FIG. 8, namely, a position of surface center O of parallel flat plate glass 1000 located when A-C axis and B-D axis are not tilted coincides with a position of surface center O of parallel flat plate glass 1000 located when A-C axis and B-D axis are tilted, it is possible to prevent distortion stress applied to parallel flat plate glass 1000. Herein, A-C axis is a virtual line that connects end EA and end EC supporting parallel flat plate glass 1000. Similarly, B-D axis is a virtual line that connects end EB and end ED supporting parallel flat plate glass 1000.

In order that the above points where A-C axis and B-D axis intersect coincide with each other, microcomputer 105 performs the following initial adjustment before normal drive described in FIG. 9.

Hereinafter, the above adjustment is described along the process flowchart of FIG. 11. In this description, positions of actuators 101 means positions of movable portions 107 of actuators 101 detected by position sensors 102.

When a power source is turned on (Step S1), positioning servo gains of actuators 101 are set to be small (Step S2). Consequently, excessive driving force is not generated in each actuator 101, even when a reference position of each actuator 101 (position at which displacement of actuator 101 is 0), and the gain are different, and position shift of an intersection of A-C axis and B-D axis occurs. Herein, positioning servo of each actuator 101 means servo-control for moving movable portion 107 of each actuator 101 to a target position.

[Origin Adjustment]

Displacement of all of actuators 101 is set to 0 ("reference position") (Step S3). Next, in Step S4, adjustment is performed such that the points where A-C axis and B-D axis intersect coincide with each other (hereinafter referred to as "origin adjustment"). This origin adjustment is adjustment for positioning ends EA, EB, EC and ED of parallel flat plate glass 1000 on the same plane.

Target positions of all of actuators 101 are set to reference positions in Step S3. At this time, errors sometimes occur in the respective reference positions of actuators 101 due to fluctuation in respective mounting positions of actuators 101 or the like, and end EA, EB, EC and ED of parallel flat plate glass 1000 are not sometimes present on the same plane.

Therefore, a target position of actuator D101*d* is adjusted, and a position at which it can be determined that driving force of actuator D101*d* is minimum, namely, position shift of the intersection of A-C axis and B-D axis is minimum, is reset as the reference position of actuator D101*d* (Step S4).

By this operation, the reference positions of all of actuators 101 are located on the same plane. Although actuator D101d is adjusted in Step S4, any one of actuator A101a to D101d may be adjusted.

[A-C Axis Gain Adjustment]

The target position of actuator D101d is set to a plus (+) direction maximum value, and a target position of actuator B101b is set to a minus (−) direction maximum value (Step S5).

However, actual amounts of movement of actuator D101d and actuator B101b differ depending on a sensitivity difference between position sensor 102d and position sensor 102b that detect amounts of movement from the reference positions of actuator D101d and actuator B101b.

Therefore, subsequent to Step S5, the displacement amount of actuator D101d is adjusted (this is defined as A-C axis gain adjustment) such that surface center O of parallel flat plate glass 1000 is not displaced by displacement of actuator B101b and actuator D101d, namely, actual displacement amounts of actuator D101d and actuator B101b coincide. The adjustment is performed by multiplying the displacement amount of actuator D101d by a coefficient (this coefficient is defined as a gain correction value) such that displacement directions of actuator D101d and actuator B101b are opposite, and absolute values of the displacement amounts are the same.

When surface center O of parallel flat plate glass 1000 is not displaced by the displacement of actuator B101b and actuator D101d, force acting on each of actuator A101a and actuator C101c is eliminated. By utilization of this, a gain correction value of actuator D101d is detected.

Specifically, a gain value of actuator D101d is adjusted, thereby detecting a gain value in which a difference between driving force values of actuator A101a and actuator C101c before and after the target position of actuator D101d is set to the + direction maximum value, and the target position of actuator B101b is set to the − direction maximum value is minimum.

During regular operation, this gain value is always applied as the gain correction value of actuator D101d (Step S6). Thereafter, the target positions of actuator D101d and actuator B101b are set to the reference positions (Step S7).

[B-D Axis Gain Adjustment]

A target position of actuator A101a is set to a plus (+) direction maximum value, and a target position of actuator C101c is set to a minus (−) direction maximum value (Step S8).

However, actual amounts of movement of actuator A101a and actuator C101c differ depending on a sensitivity difference between position sensor 102a and position sensor 102c that detect amounts of movement from the reference positions of actuator A101a and actuator C101c.

Therefore, subsequent to Step S8, the displacement amount of actuator C101c is adjusted (this is defined as B-D axis gain adjustment) such that surface center O of parallel flat plate glass 1000 is not displaced by displacement of actuator A101a and actuator C101c, namely, actual displacement amounts of actuator A101a and actuator C101c coincide. The adjustment is performed by multiply the displacement amount of actuator C101c by a coefficient (this coefficient is defined as a gain correction value) such that displacement directions of actuator A101a and actuator C101c are opposite, and absolute values of the displacement amounts are the same.

When surface center O of parallel flat plate glass 1000 is not displaced by the displacement of actuator A101a and actuator C101c, force acting on each of actuator D101d and actuator B101b is eliminated. By utilization of this, a gain correction value of actuator C101c is detected.

Specifically, a gain value of actuator C101c is adjusted, thereby detecting a gain value, in which a difference between driving force values of actuator B101b and actuator D101d before and after the target position of actuator A101a is set to the + direction maximum value, and the target position of actuator C101c is set to the − direction maximum value is minimum.

During regular operation, this gain value is always applied as the gain correction value of actuator C101c (Step S9).

When B-D axis gain adjustment is terminated, positioning servo gain values are set to regular values (Step S10). Thereafter, the process transfers to regular operation described in FIG. 9 (Step S11).

Microcomputer 105 performs such adjustment, so that the above points where A-C axis and B-D axis intersect always are controlled to coincide at predetermined positions during regular operation.

[1-3. Effects and the Like]

Thus, in optical member driving device 1111, it is possible to achieve a structure in which rotation of parallel flat plate glass 1000 is achieved with a rotational moment obtained by increase in only the rotational moment of connecting members 110, which is substantially equal to the rotational moment in a case of the direct connection shown in FIG. 6A, and a component larger than parallel flat plate glass 1000, for example, a prism can be disposed on the side close to actuators 101 of parallel flat plate glass 1000.

Second Exemplary Embodiment

Figure 12A:
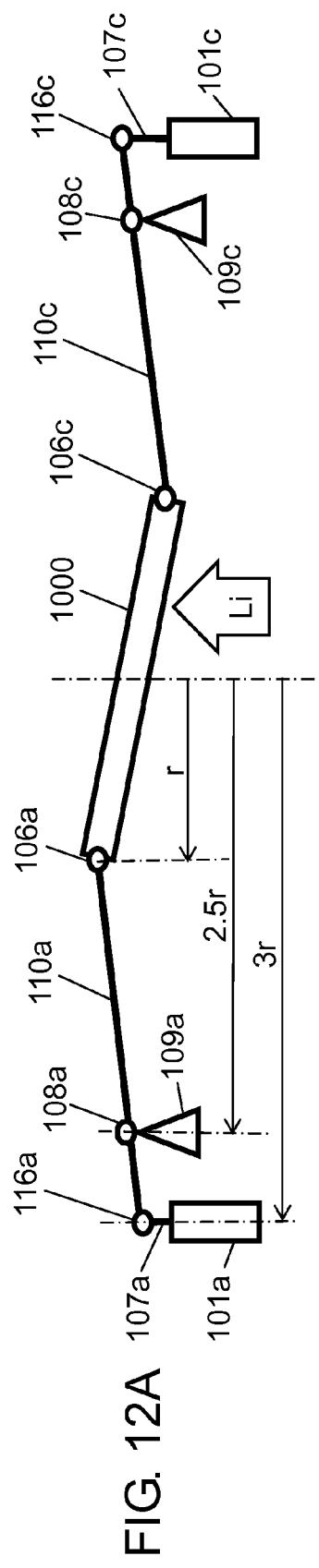
FIG. 12A and FIG. 12B are diagrams showing a principle and operation of an optical member driving device of a second exemplary embodiment.
Figure 12B:
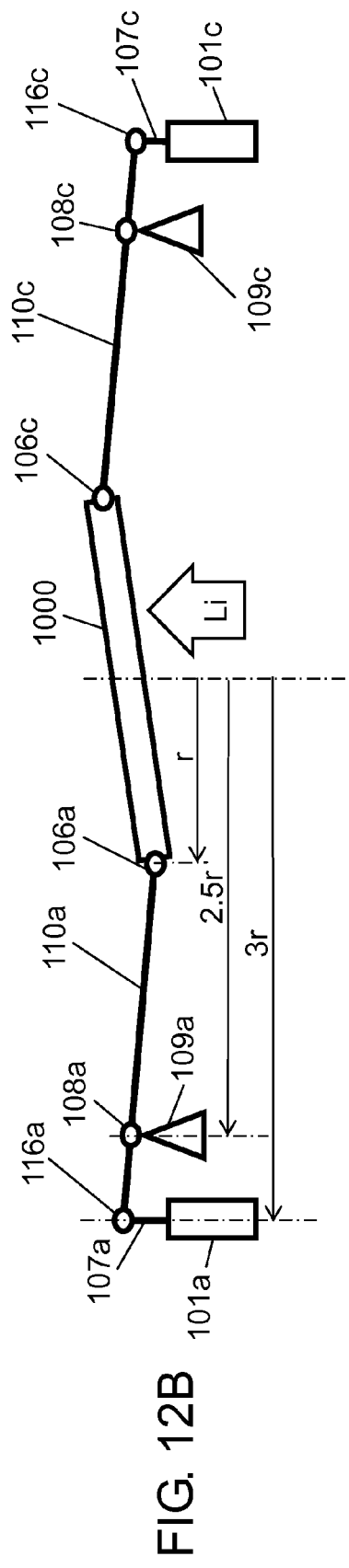

FIG. 12A and FIG. 12B each show a configuration in which a ratio of a distance of a fulcrum of each lever configured from connecting member 110 and support portion 109 and a point of effort, to a distance between the fulcrum and a point of load is changed to 1:3 from 1:1 shown in FIG. 5C, FIG. 6A, and FIG. 6B. FIG. 12A corresponds to FIG. 6A, and FIG. 12B corresponds to FIG. 6B. According to this configuration, each end of parallel flat plate glass 1000 moves by three times a displacement amount of actuator 101. Conversely, a displacement amount of each actuator 101 for moving the end of parallel flat plate glass 1000 by the same amount as the case shown in each of FIG. 5C, FIG. 6A, and FIG. 6B is only ⅓.

That is, the displacement amount is equivalent to the displacement amount in a case where a position of ⅓ of distance r from surface center O of parallel flat plate glass 1000 to each end is driven by actuator 101, and therefore increase in a rotational moment by mass of movable portions 107 of actuators 101 is ⅑. On the other hand, driving force required for each actuator 101 is three times.

Other Exemplary Embodiments

A case where a ratio of a distance of a fulcrum of each lever configured from connecting member 110 and support portion 109 and a point of effort, to a distance between the fulcrum and a point of load is 1:3, and a case where the ratio is 1:1 are described. However, this ratio is adjustable in consideration of an increased amount of a rotational moment by movable portions 107 of actuators 101, and driving force of each actuator 101.

The ratio of the distance of the fulcrum of each lever configured from connecting member 110 and support portion 109 and the point of effort, to a distance between the fulcrum and the point of load may be adjusted in a range of 1:3 to 3:1, and a case where this ratio is 1:1 is an optimum condition.

Support portions 109 are configured so as to support connecting members 110 from ground, but are not limited to this configuration. Support portions 109 may be configured so as to support connecting members 110 from a top surface, or may be configured so as to support connecting members 110 from side surfaces.

In the above exemplary embodiments, actuators 101 are used as driving mechanisms. However, the present disclosure is not limited to this, and driving mechanisms that continuously generate power, such as motors and engines, may be used.

Application Example

Figure 13:
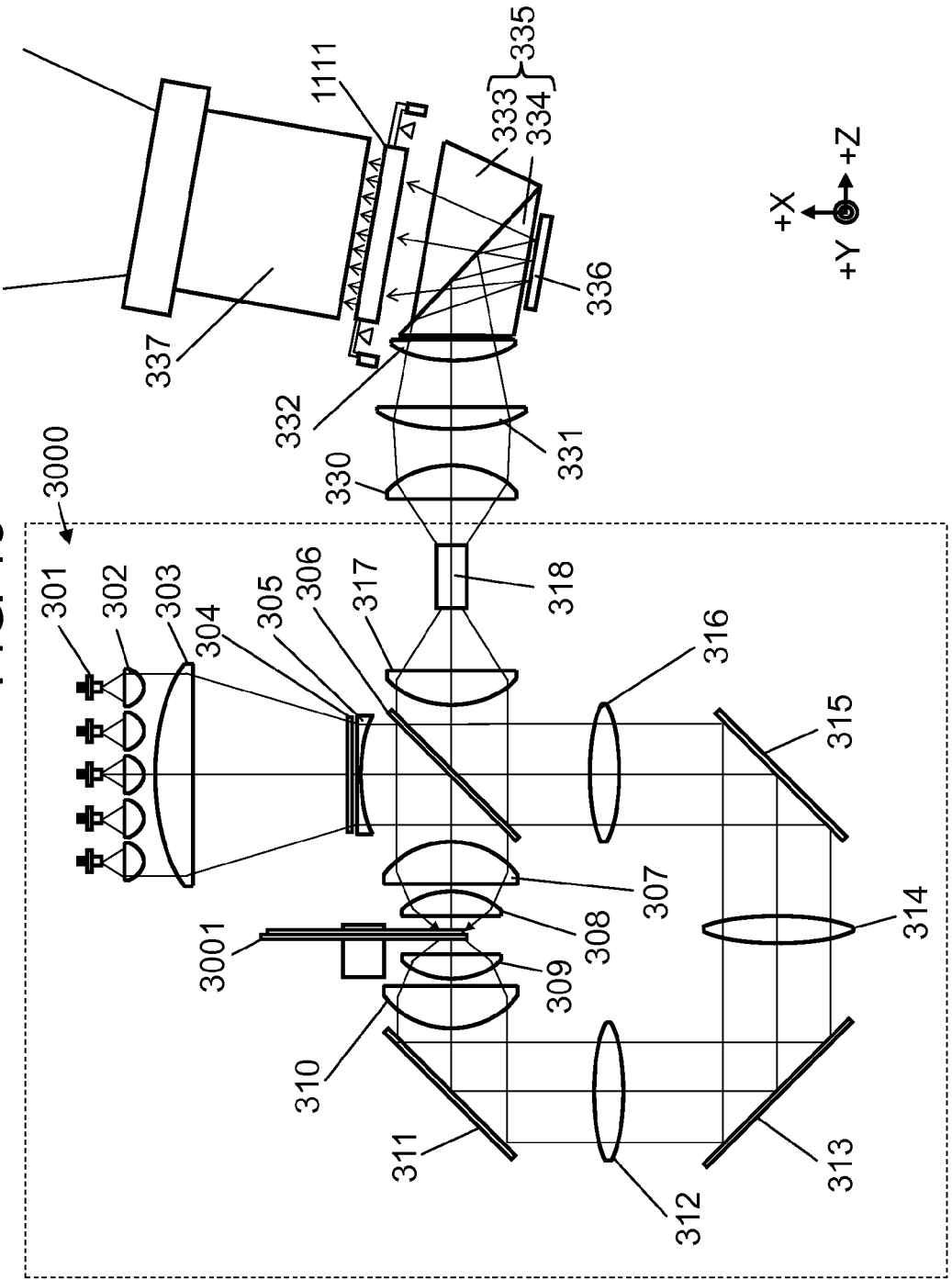
FIG. 13 is a diagram showing a projection image display apparatus to which an optical member driving device is applied.
Figure 14:
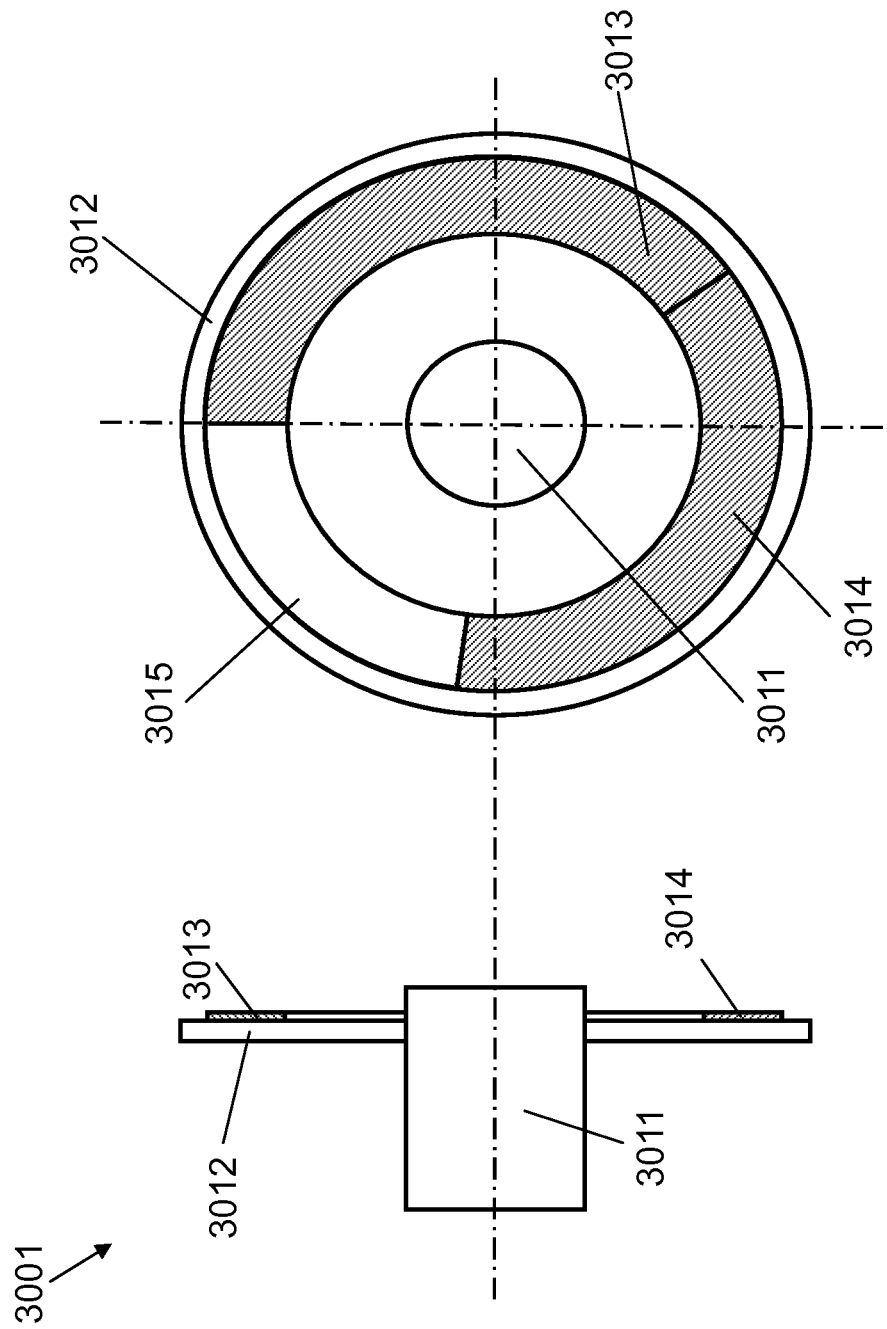
FIG. 14 is a diagram for illustrating a configuration of a phosphor wheel used in the projection image display apparatus.

The optical member driving device of the present disclosure is applicable to a projection image display apparatus. FIG. 13 and FIG. 14 are diagrams for illustrating a configuration of an optical system of a projection image display apparatus using optical member driving device 1111 of the present disclosure.

For the following description, a XYZ rectangular coordinate system shown in the drawing is employed in FIG. 13. Now, illumination optical system 3000 of projection image display apparatus is described.

Laser light sources 301 are blue semiconductor lasers, and are configured by a plurality of semiconductor lasers in order to achieve a high luminance lighting apparatus. Respective laser beams emitted from laser light sources 301 are collimated by corresponding collimator lenses 302. The light beams emitted from collimator lenses 302 are substantially parallel light beams. Whole luminous flux is condensed by condenser lens 303 to pass through diffuser 304, and thereafter is substantially collimated by lens 305 again. The laser luminous flux collimated by lens 305 is incident upon dichroic mirror 306 disposed at about 45 degrees with respect to an optical axis.

Diffuser 304 is a glass flat plate, and is formed with a diffusion surface having fine unevenness. Dichroic mirror 306 has a property to reflect light in a wavelength region of a blue semiconductor laser, and to transmit light in other wavelength region.

The laser beams incident upon dichroic mirror 306 from a + X-direction in the drawing are reflected on dichroic mirror 306 to be emitted in a −Z-direction in the drawing. Thereafter, the laser beams are condensed by condenser lenses 307 and 308 to excite a phosphor formed on phosphor wheel 3001.

Phosphor wheel 3001 is configured by motor 3011 and base material 3012 as shown in FIG. 14. Base material 3012 is formed with first phosphor 3013, second phosphor 3014, and opening 3015 on circumference in which distances from the rotation center of the phosphor wheel are equal. A phosphor formation surface of the base material is mirror-finished, and reflects light.

In a case where light beams condensed on phosphor wheel 3001 are condensed on phosphor 3013, fluorescence corresponding to phosphor 3013 is emitted. Herein, a red phosphor is used as phosphor 3013, and is excited by light beams of the blue semiconductor lasers to emit red light.

In a case where light beams condensed on phosphor wheel 3001 are condensed on phosphor 3014, fluorescence corresponding to phosphor 3014 is emitted. Herein, a green phosphor is used as phosphor 3014, and is excited by light beams of the blue semiconductor lasers to emit green light beams.

Furthermore, in a case where light beams condensed on phosphor wheel 3001 are condensed on opening 3015, light beams of the blue semiconductor lasers are transmitted.

The red light beams and the green light beams obtained by phosphor wheel 3001 are reflected from phosphor wheel 3001. These red light beams and green light beams are collimated by condenser lenses 308 and 307 to be transmitted through dichroic mirror 306, and are condensed by condenser lens 317 to be incident upon rod integrator 318.

On the other hand, blue light beams of the blue semiconductor lasers that are transmitted through opening 3015 advance along a route from lens 309 to lens 316 through lens 310, mirror 311, lens 312, mirror 313, lens 314, and mirror 315, are reflected by dichroic mirror 306, and are condensed by condenser lens 317 to be incident upon rod integrator 318. Lenses 312, 314 and 316 function as relay lenses.

Light beams emitted from rod integrator 318 pass through lenses 330, 331 and 332, and are incident upon total reflection prism 335 including a pair of prisms 333 and 334, and incident light beams are modulated by using a video signal in DMD (Digital Mirror Device) 336 being an optical modulator element, to be emitted as image light. Lenses 330, 331 and 332 each have a function of imaging light in an emission surface of rod integrator 318 on DMD 336.

The image light beams emitted from DMD 336 are incident upon optical member driving device 1111. Optical member driving device 1111 is schematically shown in FIG. 13, and the optical member driving device described in each of the first and second exemplary embodiments can be used. Light beams emitted from optical member driving device 1111 are incident upon project lens 337, and light beams emitted from project lens 337 are magnified and projected on a screen (not shown).

Thus, the projection image display apparatus can display a plurality of different images while shifting display positions of the images in one frame period of an input image, and can perform wobbling display for improving resolution of display image in an equivalent manner, by use of a function of moving a display position of image light of optical member driving device 1111. Additionally, the projection image display apparatus is applicable to a system that shifts and displays the same images, and erases an area where no image is present between a display pixel and a display pixel, to smoothly display the image, in one frame period for an input image, or is applicable to shake prevention for detecting shake of an image generated by vibration of a projector, and correcting the shake, or the like.

Since the embodiments described above are merely examples of the technology in the present disclosure, it is understood that various modifications, replacements, additions, omissions, and the like can be performed in the scope of the claims or in an equivalent scope thereof.

The present disclosure is applicable to an optical member driving device that moves a display position of a projection image of a projection image display apparatus such as a projector.

What is claimed is:

1. An optical member driving device, comprising:
    an optical member for changing an optical path, the optical member having a parallel flat plate shape;
    a driving mechanism having a movable portion controlled to move in a direction orthogonal to a surface of the optical member by a drive signal, the driving mechanism being disposed outside the optical member;

a connecting member rotatably connecting an end of the optical member and the movable portion of the driving mechanism on two axes orthogonal to each other at a surface center of the optical member;

a support portion, disposed between the end of the optical member and the movable portion of the driving mechanism, for rotatably pivoting the connecting member; and a controller configured to control the movable portion of the driving mechanism, wherein, when letting a position at which the support portion pivotally supports the connecting member be a fulcrum of a lever, a position at which the movable portion is connected to the connecting member be a point of effort of the lever, and a position at which the optical member is connected to the connecting member be a point of load of the lever, then, a ratio of a distance between the fulcrum and the point of effort of the lever to a distance between the fulcrum and the point of load is set to 1:3 to 3:1.

2. The optical member driving device according to claim 1, wherein the ratio of the distance between the fulcrum and the point of effort of the lever to the distance between the fulcrum and the point of load is set to 1:1.

3. A projection image display apparatus, comprising:

a light source;

an optical modulator element configured to modulate light from the light source by using a video signal;

a projection optical system configured to magnify and project an image light modulated by the optical modulator element; and the optical member driving device according to claim 1 disposed between the optical modulator element and the projection optical system.

4. The optical member driving device, comprising:

an optical member for changing an optical path, the optical member having a parallel flat plate shape;

a driving mechanism having a movable portion controlled to move in a direction orthogonal to a surface of the optical member by a drive signal, the driving mechanism being disposed outside the optical member;

a connecting member rotatably connecting an end of the optical member and the movable portion of the driving mechanism on two axes orthogonal to each other at a surface center of the optical member;

a support portion, disposed between the end of the optical member and the movable portion of the driving mechanism, for rotatably pivoting the connecting member;

a controller configured to control the movable portion of the driving mechanism; and a position detector configured to detect an amount of movement of the movable portion of the driving mechanism, wherein the controller controls the driving mechanism by having the position detector detect a position sensor provided in the movable portion, and wherein the driving mechanisms are provided at four places.

5. The optical member driving device according to claim 4, wherein the driving mechanism is a voice coil motor.

6. The optical member driving device according to claim 4, wherein the controller includes a microcomputer.

7. A projection image display apparatus comprising:

a light source;

an optical modulator element configured to modulate light from the light source by using a video signal;

a projection optical system configured to magnify and project an image light modulated by the optical modulator element; and the optical member driving device according to claim 4 disposed between the optical modulator element and the projection optical system.

8. A projection image display apparatus, comprising:

a light source;

an optical modulator element configured to modulate light from the light source by using a video signal;

a projection optical system configured to magnify and project an image light modulated by the optical modulator element; and an optical member driving device disposed between the optical modulator element and the projection optical system, the optical member driving device including:

an optical member for changing an optical path, the optical member having a parallel flat plate shape, a driving mechanism having a movable portion controlled to move in a direction orthogonal to a surface of the optical member by a drive signal, the driving mechanism being disposed outside the optical member, a connecting member rotatably connecting an end of the optical member and the movable portion of the driving mechanism on two axes orthogonal to each other at a surface center of the optical member, a support portion, disposed between the end of the optical member and the movable portion of the driving mechanism, for rotatably pivoting the connecting member, and a controller configured to control the movable portion of the driving mechanism to display a plurality of different images while shifting display positions in one frame period of an input image.

* * * * *